United States Patent
Kobayashi et al.

[11] Patent Number: 5,818,147
[45] Date of Patent: Oct. 6, 1998

[54] VIBRATION ACTUATOR WITH IMPROVED CONTACT SURFACE

[75] Inventors: Mina Kobayashi, Yokohama; Kazuyasu Oone, Urawa, both of Japan

[73] Assignee: Nikon Corporation, Tokyo, Japan

[21] Appl. No.: 843,193

[22] Filed: Apr. 14, 1997

[30] Foreign Application Priority Data

Apr. 12, 1996 [JP] Japan .................................... 8-090787
Mar. 27, 1997 [JP] Japan .................................... 9-075280

[51] Int. Cl.$^6$ ........................................................ H02N 2/00
[52] U.S. Cl. ............................................ 310/323; 310/328
[58] Field of Search ...................................... 310/328, 323

[56] References Cited

U.S. PATENT DOCUMENTS

| | | | |
|---|---|---|---|
| 5,039,899 | 8/1991 | Yamaguchi | 310/323 |
| 5,051,647 | 9/1991 | Uchikawa et al. | 310/323 |
| 5,073,739 | 12/1991 | Iijima et al. | 310/323 |
| 5,101,132 | 3/1992 | Yamaguchi | 310/323 |
| 5,124,611 | 6/1992 | Tamai et al. | 310/317 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 29/25.35 |
| 5,200,665 | 4/1993 | Iijima | 310/323 |
| 5,245,243 | 9/1993 | Ohnishi et al. | 310/323 |
| 5,416,375 | 5/1995 | Funakubo et al. | 310/323 |
| 5,654,604 | 8/1997 | Ashizawa | 310/323 |

FOREIGN PATENT DOCUMENTS 7-143771 6/1995 Japan .............................. H02N 2/00

OTHER PUBLICATIONS

U.S. application No. 08/337,500, Takagi, filed Nov. 8, 1994, Nikon Corporation.
Piezoelectric Linear Motors for Application to Driving a Light Pick–Up Element, (Mr. Yoshiro Tomikawa et al., 5th Electromagnetic Force Related Dynamics Symposium, Collected Papers, Jun. 9–11, 1993, pp. 393–398)(with English translation).

*Primary Examiner*—Thomas M. Dougherty

[57] ABSTRACT

A vibration actuator has a vibration element which generates vibrations and has a contact surface. The vibration actuator further has a relative motion member which moves in a movement direction with respect to the vibration element upon generation of vibrations by the vibration element. The relative motion member has a contact surface which is in compressive contact with the contact surface of the vibration element. At least one of the contact surface of the vibration element and the contact surface of the relative motion member is polished to have a plural streaky scratches. The plural streaky scratches may be in a principle direction which is in a direction other than a direction at a right angle with respect to the movement direction. In this case, the principle direction may be at angle with respect to the movement direction. Alternatively, the principle direction may be approximately parallel to the movement direction. As an alternative to being formed in the principle direction, the plural streaky scratches may be formed in irregular directions or formed in irregular circular arcs. The at least one contact surface polished to have streaky scratches may have center line average height Ra which is a maximum in a rough direction and is within the range $0.05\ \mu m \leq Ra \leq 1.0\ \mu m$.

20 Claims, 4 Drawing Sheets

FIG. 3A — ① IRREGULAR DIRECTION

FIG. 3B — ② OBLIQUE

FIG. 3C — ③ IRREGULAR CIRCULAR ARCUATE

FIG. 3D — ④ LONGITUDINAL

FIG. 3E — ⑤ TRANSVERSE

FIG. 3F — ⑥ SAND POLISHED

FIG. 3G — ⑦ MIRROR SURFACE

FIG. 3H — ⑧ COT

VIBRATION ACTUATOR WITH IMPROVED CONTACT SURFACE

CROSS-REFERENCE TO RELATED APPLICATIONS

This application is based upon and claims priority to Japanese Patent Application Nos. 08-090787 and 09-075280 filed Apr. 12, 1996 and Mar. 27, 1997, respectively, the contents of which are incorporated herein by reference.

BACKGROUND OF THE INVENTION

1. Field of the Invention

The present invention relates to vibration actuators in general. More specifically, the present invention relates to a vibration actuator in which a vibration element is excited by electro-mechanical converting elements, by causing plural vibrations to arise harmonically, the excitation causing an elliptic motion in the surface of the vibration element, and generating 1-dimensional relative motion with respect to a relative motion member which is in compressive contact with the vibration element.

2. Description of the Related Art

Vibration actuators are known in which at least two electro-mechanical converting elements are united with an elastic member serving as a vibration element, and by applying alternating voltages (which serve as respective drive signals) to the electro-mechanical converting elements, plural vibrations are harmonically generated in the elastic member, and elliptic motion is caused in the surface of the elastic member.

An example of a vibration actuator of this kind is described in detail in "Piezo-electric Motors Intended for Optical Pickup Motion" (Yoshio Tomikawa et al., Collected Papers, 5th Dynamics Symposium Related to Electromagnetic Forces) with the load characteristics also being described in this reference.

Figure 4A:
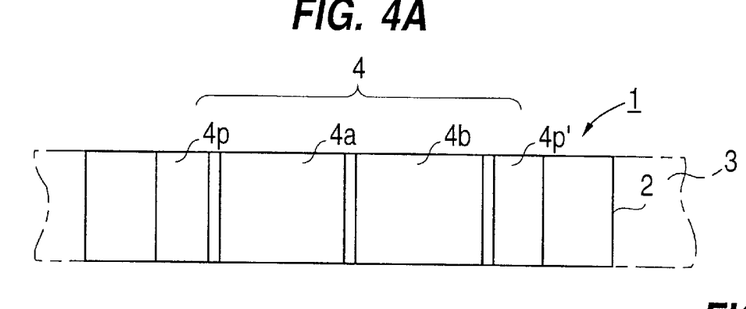
FIG. 4A is a top view of a conventional vibration actuator.
Figure 4B:
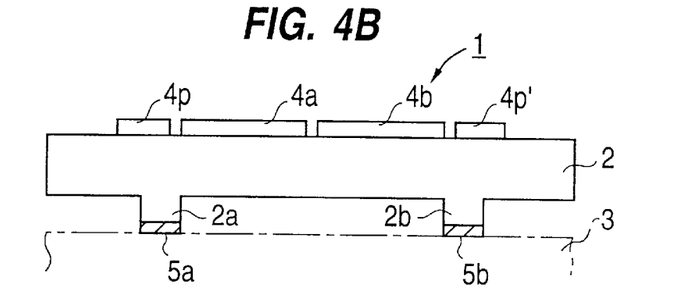
FIG. 4B is a front view of the conventional vibration actuator shown in FIG. 4A.
Figure 4C:
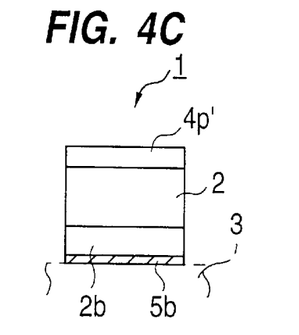
FIG. 4C is a right-hand side view of the conventional vibration actuator shown in FIG. 4A.
Figure 4D:
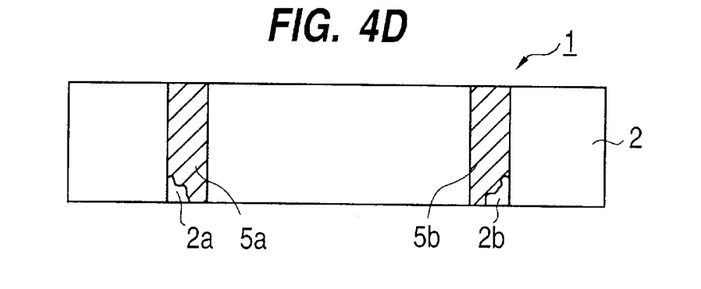
FIG. 4D is a bottom view of the conventional vibration actuator shown in FIG. 4A.

FIGS. 4A–4D are diagrams showing a vibration actuator 1. FIG. 4A is a top view, FIG. 4B is a front view, FIG. 4C is a right-hand side view, and FIG 4D is a bottom view. In FIG. 4D, slide members 5a, 5b are partially removed to expose an elastic body 2.

The vibration actuator 1 has elastic body 2 (made of stainless steel, an aluminum alloy or a similar metal, or made of plastic material or similar elastic material) having a parallelepiped shape. Elastic body 2 has driving force output members 2a, 2b which protrude from the surface of one side thereof. The vibration actuator 1 has a relative motion member 3 in compressive contact with the elastic member 2 via the driving force output members 2a, 2b. A compression mechanism (not shown) causes the compressive contact. The driving force output members 2a, 2b are formed in two places at antinode positions of a fourth order bending vibration which arises in the elastic member 2.

Rectangular plate shaped piezoelectric elements 4a, 4b, 4p, 4p', which are electro-mechanical converting elements, are mounted on a side of the elastic member 2 opposite the force output members 2a, 2b.

The piezoelectric elements 4a, 4b are piezoelectric elements used for driving. Alternating voltages which have an electrical differing by 90° are applied to the piezoelectric elements 4a, 4b. Moreover, the piezoelectric elements 4p, 4p' are piezoelectric elements which act as electromechanical converters in order to detect the vibrational state which arises in the elastic member 2. Lead wires (not shown in the drawings) are soldered to the piezoelectric elements 4a, 4b, 4p, 4p', and the lead wires are respectively connected to control circuits (likewise not shown in the drawings).

A first order longitudinal vibration and a fourth order bending vibration arise harmonically in the piezoelectric elements 4a, 4b due to the respective alternating voltages. The alternating voltages are driving signals and are applied to the piezoelectric elements 4a, 4b from respective drive voltages generating devices (not shown in the drawings). The longitudinal vibration and the bending vibration are combined, and elliptic displacement results in the end faces of the driving force output members 2a, 2b. The elliptic displacement is elliptical with respect to the length of the elastic member 2. The elliptic displacement results in elastic member 2 moving with respect to the relative motion member 3 which is in compressive contact with the elastic member 2. That is, the driveing force output members 2a, 2b cause the motion.

In this kind of vibration actuator 1, the characteristic frequencies of the first order longitudinal vibration and the fourth order bending vibration have values which are very close to each other or the same. Because of this, it is possible to apply the piezoelectric elements 4a, 4b two alternating voltages respectively having frequencies close to the characteristic frequencies and thereby harmonically generate first order longitudinal vibration and fourth order bending vibration.

In FIGS. 10A–10D, the end faces of the driving force output members 2a, 2b have protrusions thereon. Slide members 5a, 5b which act as driving surfaces for the elastic member 2, are affixed respectively to the entire bottom surface of driving force output members 2a, 2b. Slide members 5a, 5b reduce the driving resistance from the relative motion member 3. It is possible to use organic materials (polyethernitrile or the like) or inorganic materials (for example, electroless Ni—P plating layers and the like) as the slide members 5a, 5b.

On the other hand, the surface of the relative motion member 3, which is in contact with the slide members 5a, 5b, is, according to the related art, finished as a smooth metal surface (center line average height Ra of 0.01 $\mu$m or less). The relative motion member 3 is finished using a mirror lapping process. The contact surface of relative motion member 3 is as smooth as possible, and the smooth surface is thought to bring about contact stability between the elastic member 2 and the relative motion member 3. The smoothness is also thought to maintain uniform contact, and thereby increase the driving efficiency of the vibration actuator 1.

Generally, in a vibration actuator 1, when the coefficient of friction $\mu$ between the contact surfaces of the elastic member 2 and the relative motion member 3 is high, the driving force is high. However, the wear resistance on the slide member 5a, 5b which is between the elastic member 2 and the relative motion member 3 is high. Wear results between the contact surfaces because the elastic member 2 and the relative motion member 3 are usually formed of a ferrous, stainless steel, aluminum alloy, or similar material each having a high modulus of elasticity.

With wear, control during driving becomes difficult, and moreover, dust results due to wear. Accordingly, the field of use of the vibration actuator becomes markedly limited. Furthermore, roughness form wear in the contact surfaces causes increased wear, and the life of the vibration actuator 1 becomes very short.

An important feature of a vibration actuator is its silence, but according to investigations by the present inventors, noise arises when a mirror polishing process is performed on the surface of the relative motion member 3. This is an important problem, because the silence of the vibration actuator is lost.

It has been considered to use a cutting process on the surface instead of a mirror polishing. However, according to the present inventors' research, because large residual undulations remain in the surface after a grinding process, the contact state of the slide members becomes unstable, and the relative motion member 3 is not driving stably.

Furthermore, wear of the slide members 5a, 5b occurs when the vibration actuator 1 is driven. Because of this, wear dust accumulates in the contact surface where the cutting process was performed. After a temporary stoppage of the vibration actuator 1, restarting was difficult.

SUMMARY OF THE INVENTION

Accordingly, it is an object of the present invention to increase wear resistance in a vibration actuator, between a relative motion member and a vibration element.

It is a further object of the present invention to reduce the amount of dust created from wear of contact surfaces in a vibration actuator.

It is a still further object of the present invention to provide a vibration actuator which has an extended life and is quiet.

It is yet another object of the present invention to provide a vibration actuator which does not temporarily stop and, even if it does stop, is not difficult to restart.

Additional objects and advantages of the invention will be set forth in part in the description which follows, and, in part, will be obvious from the description, or may learned by practice of the invention.

According to a preferred embodiment of the present invention, a vibration actuator has a vibration element which generates vibrations and has a contact surface. The vibration actuator further has a relative motion member which moves in a movement direction with respect to the vibration element upon generation of vibrations by the vibration element. The relative motion member has a contact surface which is in compressive contact with the contact surface of the vibration element. At least one of the contact surface of the vibration element and the contact surface of the relative motion member is polished to have plural streaky scratches.

The plural streaky scratches may be in a principle direction which is at a direction other than a direction at a right angle with respect to the movement direction. In this case, the principle direction may be at angle with respect to the movement direction. Alternatively, the principle direction may be approximately parallel to the movement direction. As an alternative to being formed in the principle direction, the plural streaky scratches may be formed in irregular directions or formed in irregular circular arcs.

The at least one contact surface polished to have streaky scratches may have center line average height Ra which is a maximum in a rough direction and is within the range 0.05 $\mu m \leq Ra \leq 1.0 \mu m$.

The vibration element may have a rectangular configuration, and the vibrations may included a longitudinal vibration and a bending vibration. The longitudinal vibration is in a direction parallel to the movement direction, and the bending vibration is in a direction which intersects the direction of longitudinal vibration.

BRIEF DESCRIPTION OF THE DRAWINGS

These and other objects and advantages of the invention will become apparent and more readily appreciated from the following description of the preferred embodiments taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

FIG. 1 is an illustrative diagram of an ultrasonic actuator 11 of a first preferred embodiment of the invention. FIG. 1A is a front view of the ultrasonic actuator 11. FIG. 1B is a side view of the ultrasonic actuator 11. FIGS. 1C–1F are enlarged diagrams of four variations in the surface ("contact surface 3A") of the relative motion member 3 in contact with the elastic member 2. Elastic member 2 serves as the vibration element.

The difference between the ultrasonic actuator 11 of this embodiment and the vibration actuator 1 shown in FIGS. 4A–4D is the state of the contact surface 3a of the relative motion member 3 and the locations at which the slide members 5a, 5b are adhered.

In this embodiment, the slide members 5a, 5b are not formed on the whole surface of the elastic member 2 in the width direction, but are formed only at outer portions in the width direction. See the side view of FIG. 1B in which slide member 5b and 5d can be seen. Viewing the front view of FIG. 1A, slide member 5C is formed behind slide member 5a. The amplitude is greatly different at the sides and in the middle (width direction) of the elastic member 2. For this purpose, slide members 5a, 5b, 5c, 5d are located only at the sides, where the difference in amplitude is very small.

Figure 1A:
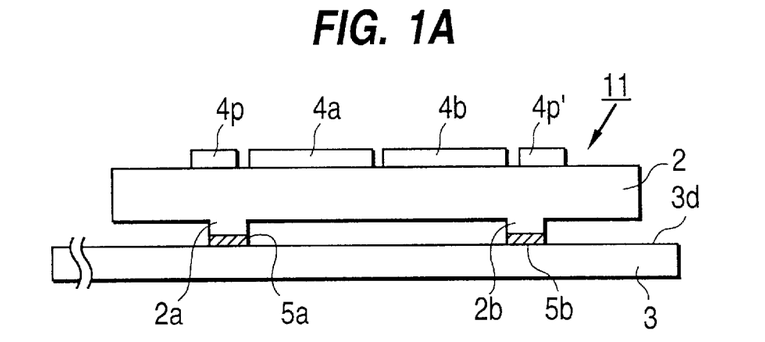
FIG. 1A is a front view of an ultrasonic actuator according to a first of embodiment of the present invention.
Figure 1B:
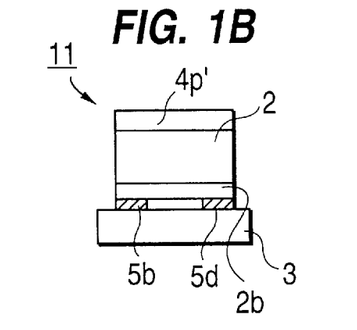
FIG. 1B is a side view of an ultrasonic actuator according to a first of embodiment of the present invention.

Moreover, in this embodiment, the slide members are formed of a mixed resin matrix having glass fiber and molybdenum added to polytetrafluoroethylene (PTFE) (Trade name: Polyflon (Daikin Industries, Ltd.)).

In this embodiment, there is only a description of the contact surface 3a of the relative motion member 3h. The portions which are the same as the vibration actuator shown in FIGS. 4A–4D are denoted by the same reference symbols, and duplicate descriptions are omitted.

In the present embodiment, the polishing streaks in the contact surface 3a may have a principal direction which is not perpendicular to the direction of relative motion of the relative motion member 3 with respect to the elastic member 2. Such polishing streaks are streaks which appear in the source of polishing the contact surface 3a of the relative motion member 3 using, for example, a grinder or the like. FIG. 1D shows oblique polishing streaks 8. FIG. 1F shows longitudinal polishing streaks 10.

Figure 1C:
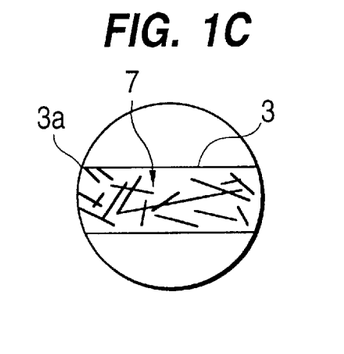
FIG. 1C is an enlarged diagram showing polished streaks formed in irregular directions in a relative motion member according to a preferred embodiment of the present invention.
Figure 1D:
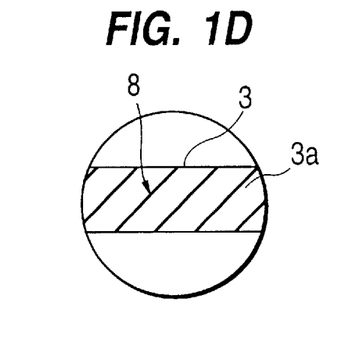
FIG. 1D is an enlarged diagram showing polished streaks formed in an oblique direction in a relative motion member according to a preferred embodiment of the present invention.
Figure 1E:
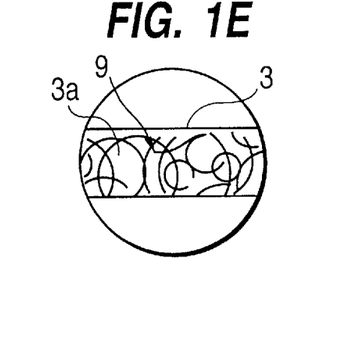
FIG. 1E is an enlarged diagram showing polished streaks formed in circular arcuate directions in a relative motion member according to a preferred embodiment of the present invention.
Figure 1F:
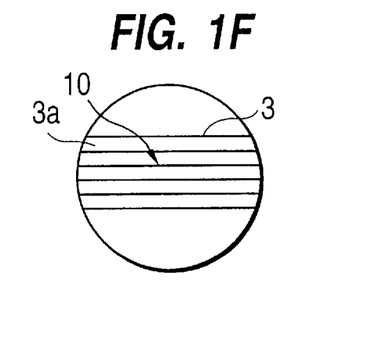
FIG. 1F is an enlarged diagram showing polished streaks formed in a longitudinal direction in a relative motion member according to a preferred embodiment of the present invention.

As shown in FIG. 1C, the polishing streaks (polishing streaks 7) may be formed in irregular directions. As shown in FIG. 1E, the polishing streaks (polishing streaks 9) may be formed in irregular circular arcuate directions. All of polishing streaks 7–10 are within the scope of the polishing streaks of the preferred embodiment of the present invention. Namely, the polishing streaks have a principal component which is not perpendicular to the direction of relative motion.

When the principal component of the polishing streaks is in a direction which is perpendicular to the direction of relative motion, wear dust accumulates in the polishing streaks, and anomalous stopping of the ultrasonic actuator 11 occurs at an early stage.

In contrast to this, according to the present embodiment, the polishing streaks are formed in directions which are not perpendicular to the direction of relative motion. Therefore, even though wear dust will lay in the polishing streaks, the wear dust is pushed out by wear dust which is formed thereafter. Accordingly, wear dust does not accumulate in the contact portions of the slide member 5a–5d. Accordingly, anomalous stoppages which are due to the accumulation of wear dust are eliminated.

Moreover, if the relative motion member 3 is to make reciprocating motions with respect to the elastic member 2, wear dust accumulates in the reciprocation portion in the longitudinal polishing streaks 10, and there is a possibility of anomalous stoppage at a relatively early stage. In such a case, the irregular direction polishing streaks 7, oblique polishing streaks 8, or irregular circular arcuate polishing streaks 9 are preferable.

According to a preferred embodiment, the center line average height Ra of the contact surface 3a in which polishing streaks have been formed is preferably within the range $0.05\ \mu m \leq Ra \leq 1.0\ \mu m$. If the center line average height Ra is less than $0.05\ \mu m$, a sliding sound tends to be generated. On the other hand, if the center line average height exceeds $1.0\ \mu m$, the contact state of the slide member 5a–5d becomes unstable, and the driving of the relative motion member 3 tends to become unstable.

The ultrasonic actuator 11 of the present embodiment achieves the following results:

1. The amount of wear generated by abrasion between the slide members 5a–5d and the contact surface 3a is small, and a stabilized state can be maintained for a long period;
2. A sliding noise is not generated by the slide members 5a–5d during driving;
3. Driving is stabilized over a long period; and
4. Anomalous stoppages form accumulation or wear dust are markedly suppressed.

Second Embodiment

Figure 2A:
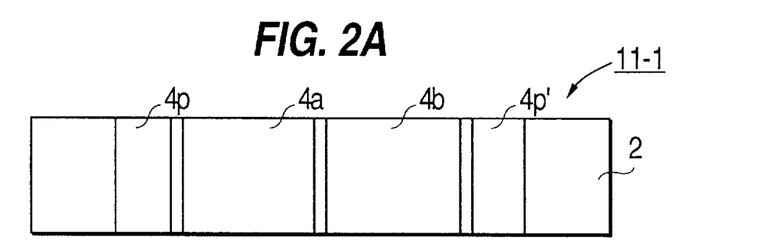
FIG. 2A is a top view of an ultrasonic actuator according to a second embodiment of the present invention.
Figure 2B:
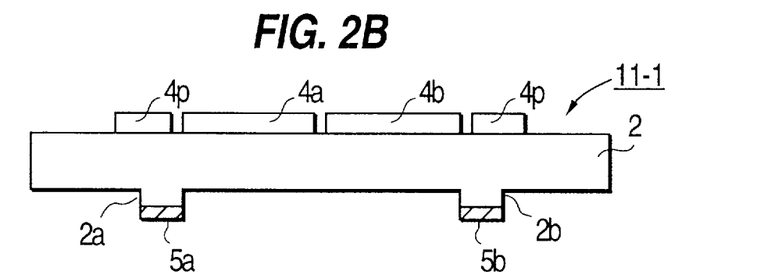
FIG. 2B is front view of an ultrasonic actuator according to the second embodiment of the present invention.
Figure 2C:
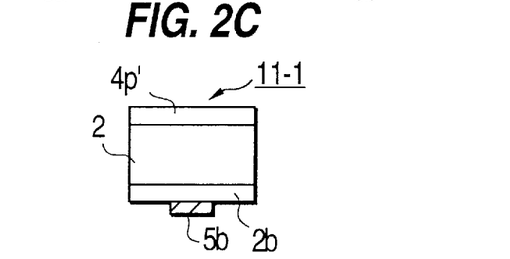
FIG. 2C is side view of an ultrasonic actuator according to the second embodiment of the present invention.
Figure 2D:
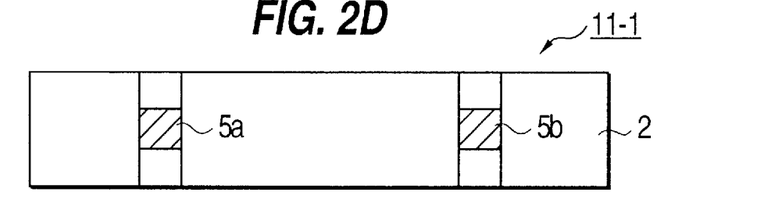
FIG. 2D is bottom view of an ultrasonic actuator according to the second embodiment of the present invention.
Figure 3A:
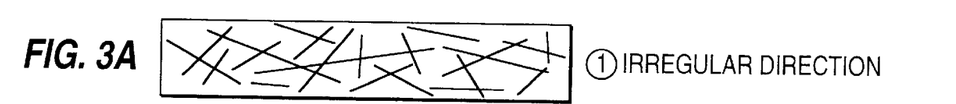
FIG. 3A is an illustration of a relative motion member having irregular direction polishing streaks.
Figure 3B:
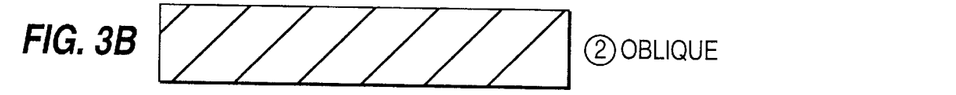
FIG. 3B is an illustration of a relative motion member having oblique direction polishing streaks.
Figure 3C:
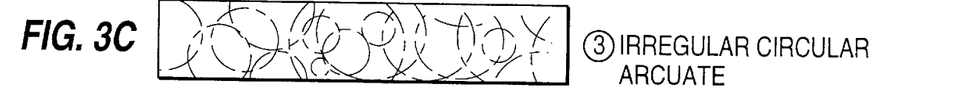
FIG. 3C is an illustration of a relative motion member having irregular circular arcuate polishing streaks.
Figure 3D:
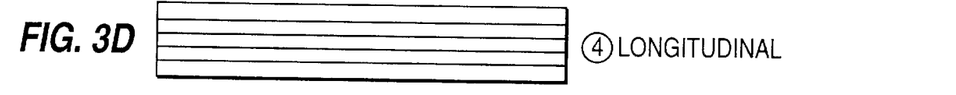
FIG. 3D is an illustration of a relative motion member having longitudinal direction polishing streaks.
Figure 3E:
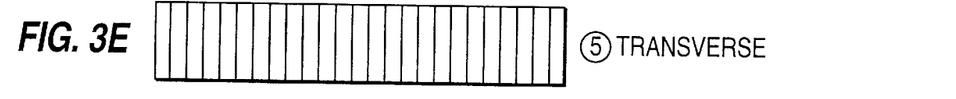
FIG. 3E is an illustration of a relative motion member having transverse direction polishing streaks.
Figure 3F:
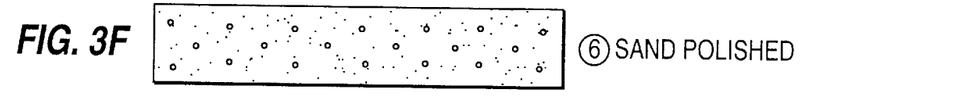
FIG. 3F is an illustration of a relative motion member having a sand polished surface.
Figure 3G:
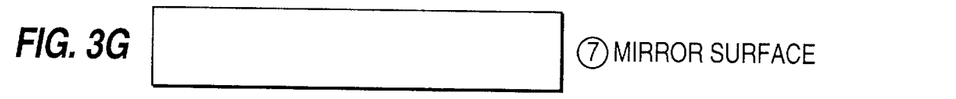
FIG. 3G is an illustration of a relative motion member having a mirror polished surface.
Figure 3H:
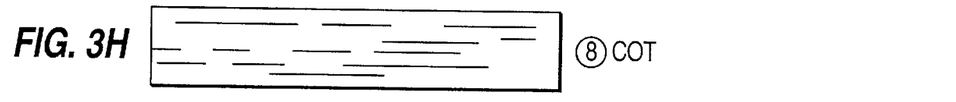
FIG. 3H is an illustration of a relative motion member having a cut finished surface.

FIGS. 2A–2D are illustrative diagrams of an ultrasonic actuator 11-1 of a second preferred embodiment of the invention. FIG. 2A is a top view, FIG. 2B is a front view, FIG. 2C is a side view, and FIG. 2D is a bottom view. The difference between the ultrasonic actuator 11-1 of this second embodiment and the ultrasonic actuator 11 of the first embodiment is the mounting position of the slide members. In this embodiment, approximately square shaped slide member 5a, 5b are affixed to the elastic member at central positions in the width direction (the middle of elastic member 2). That is, the slide members are affixed to the bottom surface of the driving force output members 2a, 2b. By affixing the slide members 5a, 5b at this position, the compression state of the elastic member 2 and the slide members 5a, 5b is stabilized.

The preferred embodiments of the present invention will now be described in detail with reference to the examples.

Example One

A vibration actuator as shown in FIGS. 1A and 1B was formed. 304 stainless steel (SUS 304) was used for the elastic member 2 which was formed to the shape in FIGS. 1A and 1B. The slide members 5a–5d were prepared to the predetermined configuration using PTFE (Trade name: Polyflon (Daikin Industries, Ltd.)) containing 15 wt. % glass fiber and 5 wt. % molybdenum disulfide. This material was obtained from Daikin Industries, Ltd. An epoxy adhesive was used to mount of the slide members 5a–5d to the driving force output members 2a, 2b of the elastic member 2. Irregular direction polishing streaks were formed on the surface of the stainless steel (SUS 304) relative motion member 3 using a copper polishing plate (Tradename Kemet lapping plate, Engis Japan Corporation) and 9 $\mu m$ diamond polish, by means of polishing in a randomly varying directions.

The ultrasonic actuator 11 formed in this manner, when driven to generate vibrations by impression drive voltages to the piezoelectric elements 4a, 4b, satisfied the five items described below.

1. The amount of wear generated by abrasion of the slide members 5a, 5b and the contact surface 3a was very small, and a stabilized state could be maintained for a long period of time;
2. A sliding noise was not generated by the slide member 5a, 5b during driving;
3. Driving was stabilized over a long period of time; and
4. Anomalous stoppages due to wear dust accumulation did not occur.

From the above results, it was confirmed that there are no problems with practical use of the ultrasonic actuator 11 fabricated as described, and the ultrasonic actuator 11 has sufficient practical utility.

Example Two

Relative motion members 3 having eight different kinds of contact surfaces shown respectively in FIGS. 3A through 3H were combined with elastic members 2. Otherwise, the vibration actuator was formed in the same way as that described with reference to Example One.

1. Irregular direction polishing streaks (center line average height Ra=0.09 μm, formed using a copper polishing plate (Kemet) and 9 μm diamond polish)—See FIG. 3A;
2. Oblique polishing streaks (center line average height Ra=0.09 μm, formed using a copper polishing plate (Kemet) and 9 μm diamond polish)—See FIG. 3B;
3. Irregular circular arcuate polishing streaks (center line average height Ra=0.09 μm, formed using a copper polishing plate (Kemet) and 9μ diamond polish)—See FIG. 3C;
4. Longitudinal polishing streaks (center line average height Ra=0.09 μm, formed using a copper polishing plate (Kemet) and 9 μm diamond polish)—See FIG. 3D;
5. Transverse streaks (center line average height Ra=0.09 μm, formed using a copper polishing late (Kemet) and 9 μm diamond polish)—See FIG. 3E;
6. Sand polished surface (center line average height Ra=0.09 μm, formed using a cast iron polishing plate and sand polishing (about 9 μm sand)—See FIG. 3F;
7. Mirror polished surface (center line average height Ra=0.01 μm, formed using a copper polishing plate (Kemet) and ¼ μm diamond polish)—See FIG. 3G; and
8. Cut finishing (center line average height Ra=0.5 μm, formed using a milling machine)—See FIG. 3H.

For the eight kinds of ultrasonic actuators which were obtained in this manner, performance was evaluated under the following experimental conditions. Vibrations ere generated by impressing drive voltages on the piezoelectric elements and continuously driving on a driving surface (rail surface). The time required was then measured from the commencement of driving to a stoppage arising due to wear dust accumulation. Table 1 shows the collected results.

Experimental Conditions
Contact surface pressure: 30 g/mm²
Driving speed; 2,000 cm/min
Trial time: 1,000 hr

TABLE 1

| Sample No. | Contact Surface State | Time from drive start to stoppage due to wear dust accumulation | Notes |
|---|---|---|---|
| 1. | Irregular direction polishing streaks | ≧1,000 hr | Inventive Examples |
| 2. | Oblique polishing streaks | ≧1,000 hr | |
| 3. | Irregular circular arcuate polishing streaks | ≧1,000 hr | |
| 4. | Longitudinal polishing streaks | ≧1,000 hr | |
| 5. | Transverse polishing streaks* | 523 hr | Comparison Examples |
| 6. | Sand polished surface* | 15 hr | |
| 7. | Mirror polished surface* | 30 hr | |
| 8. | Cut finished surface* | 0 hr | |

(Note: * indicates outside the range of the preferred embodiment of this invention)

In Sample 1 with irregular direction polishing streaks, Sample 2 with oblique polishing streaks, Sample 3 with irregular circular arcuate polishing streaks, and Sample 4 with longitudinal polishing streaks, the device was driven for the entire 1,000 hours trial time without stopping from accumulation of wear dust.

In contrast to this, in Sample 5 with transverse polishing streaks, wear dust accumulated in the streaks, and an anomalous stoppage occurred after 523 hours had elapsed. In Sample 6 with a sand polished surface, directly after the start of driving, blockage with wear dust occurred, and anomalous stoppage occurred after 15 hours had elapsed. In Sample 7 with a mirror polished surface, wear dust accumulation occurred in motor reversal places, and became an obstacle. Anomalous stoppage occurred at 30 hours.

Furthermore, in Sample 8 finishing by cutting, the center line average height Ra was in excess of the amplitude of the elliptic motion generated in the driving force output members of the elastic member. Therefore, driveing was impossible.

From the results shown in Table 1, it can be seen that the samples having irregular direction polishing streaks, oblique polishing streaks, irregular circular arcuate polishing streaks, and longitudinal polishing streaks, which are inventive samples, and also the sample having transverse polishing streaks, exceeded a target value of 500 hours of continuous driving time.

Consequently, for Samples 1 (irregular direction polishing streaks) through 5 (transverse polishing streaks), the slide member thickness (μm), no-load speed (mm/sec) and driving force (gf) were measured after 250 hours elapsed. The results are shown in Table 2.

TABLE 2

| | 250 hr elapsed time point | | |
|---|---|---|---|
| Sample No. | Slide member thickness (μm) | No-load speed (mm/sec) | Driving force (gf) |
| 1. | 240 | 302 | 75 |
| 2. | 233 | 311 | 60 |
| 3. | 237 | 298 | 65 |

TABLE 2-continued

| | 250 hr elapsed time point | | |
|---|---|---|---|
| Sample No. | Slide member thickness (μm) | No-load speed (mm/sec) | Driving force (gf) |
| 4. | 226 | 274 | 58 |
| 5. | 216 | 193 | 20 |

From Table 2, the slide member thickness (μm), no-load speed (mm/sec) and driving force (gf), after 250 hours had elapsed, exceeded target values, in Samples 1 (irregular direction polishing streaks) through 4 (longitudinal polishing streaks), which are the inventive preferred embodiment examples. Thus, the inventive preferred embodiment examples provide practical utility.

In contrast to this, for Sample 5 (transverse polishing streaks), the driving force (gf) 250 was markedly lower, due to blockage of wear dust which had occurred. Accordingly, this sample is not appropriate for use as an ultrasonic actuator.

Example Three

Performance evaluation (driving force (gf) after 10 hours had elapsed) were performed using relative motion members 3 which had been formed with irregular direction polishing streaks (see FIG. 3A) using various processing methods. In these devices, the elastic members 2 were formed as described with reference to Examples One and Two. The experimental conditions and the results are shown in Table 3.

TABLE 3

| | Experimental Conditions | | | Test Results |
|---|---|---|---|---|
| Sample | Processing method | | Ra | Driving force (gf) |
| No. | Surface plate | Polish | (μm) | after 10 hr elapsed |
| A-1 | Kemet copper | ¼ | 0.005 | 24 |
| A-2 | | 2 | 0.01 | 30 |
| B-1 | Kemet tin | 2 | 0.02 | 35 |
| B-2 | | 9 | 0.09 | 80 |
| C-1 | Cast iron | 2 | 0.05 | 75 |
| C-2 | | 9 | 0.15 | 85 |

As can be seen from Table 3, all samples had driving force (gf) values after 10 hours had elapsed which exceeded a target value, thus demonstrating practical utility. However, samples B-2, C-1 and C-2, which had center line average heights Ra in the range of $0.05 \mu m \leq Ra \leq 0.2 \mu m$, had a small reduction in driving force (gf) after 10 hours had elapsed. Thus, samples B-2, C-1 and C-2 are markedly preferable.

Example Four

Performance evaluations (starting thrust (gf) and no-load speed (mm/sec) after 20 minutes had elapsed) were performed with relative motion members having varying center line average heights as shown in Table 4. More specifically, relative motion members were prepared with longitudinal direction polishing streaks such as FIG. 3D, and combined with elastic members 2 which were formed in a manner completely similar to those of Examples One through Three. The experimental conditions and the results are shown in Table 4.

TABLE 4

| Experimental Conditions | Experimental Results | |
|---|---|---|
| Center line average height, Ra | Starting thrust (gf) | No-load speed (mm/sec) |
| 0.04* | 71 | 70 |
| 0.05 | 150 | 100 |
| 0.20 | 155 | 105 |
| 0.40 | 158 | 107 |
| 0.60 | 160 | 112 |
| 0.80 | 161 | 112 |
| 1.00 | 165 | 113 |
| 1.10* | 89 | 82 |

(Note: * denotes conditions outside the range of the preferred embodiments of the invention)

As can be seen from Table 4, the starting thrust and no-load speed after 20 minutes had elapsed were high for the samples having a center line average height from 0.05 μm to 1.00 μm. In contrast to this, for the samples outside the range of a preferred embodiment of the present invention (the samples having a center line average height of 0.04 μm and 1.10 μm), there was a marked fall in the starting thrust and no-load speed after 20 minutes had elapsed. From the above results, it can be seen that a center line average height from 0.05 μm through 1.00 μm is preferable.

Example Five

Performance evaluations (starting thrust (gf) and no-load speed (mm/sec) after 20 minutes had elapsed) were performed with relative motion members having varying center line average heights as shown in Table 5. More specifically, relative motion members with irregular direction polishing streaks such as FIG. 3A, were combined with elastic members 2 which were formed in a manner completely similar to those of Examples One through Four. The conditions and the results are shown in Table 5.

TABLE 5

| Experimental Conditions | Experimental Results | |
|---|---|---|
| Center line average height, Ra | Starting thrust (gf) | No-load speed (mm/sec) |
| 0.04* | 71 | 70 |
| 0.05 | 155 | 102 |
| 0.20 | 159 | 106 |
| 0.40 | 163 | 107 |
| 0.60 | 167 | 113 |
| 0.80 | 168 | 113 |
| 1.00 | 170 | 115 |
| 1.10* | 90 | 83 |

(Note: * denotes conditions outside the range of the preferred embodiment of the invention)

As can be seen from Table 5, the starting thrust and no-load speed after 20 minutes had elapsed were high for samples having center line average heights Ra from 0.05 μm to 1.00 μm. In contrast to this, for the samples outside the range of a preferred embodiment of the present invention (the samples having a center line average height of 0.04 μm and 1.10 μm), there was a marked fall in the starting thrust and no-load speed after 20 minutes had elapsed. From the above results, it can be seen that a center line average height from 0.05 μm through 1.00 μm is preferable.

Example Six

Performance evaluations (starting thrust (gf) and no-load speed (mm/sec) after 20 minutes had elapsed) were performed with relative motion members having varying center line average heights as shown in Table 6. More specifically, relative motion members were prepared with irregular circular arcuate polishing streaks such as FIG. 3C, and combined with elastic members which were formed in a manner completely similar to those of Examples One through Five. The experimental condition and results are shown in Table 6.

TABLE 6

| Experimental Conditions | Experimental Results | |
| --- | --- | --- |
| Center line average height, Ra | Starting thrust (gf) | No-load speed (mm/sec) |
| 0.04* | 70 | 70 |
| 0.05 | 153 | 101 |
| 0.20 | 157 | 106 |
| 0.40 | 162 | 106 |
| 0.60 | 165 | 113 |
| 0.80 | 164 | 112 |
| 1.00 | 169 | 114 |
| 1.10* | 91 | 81 |

(Note: * denotes conditions outside the range of the preferred embodiment of the invention)

As can be seen from Table 6, the starting thrust and no-load speed after 20 minutes had elapsed were high for samples having center line average heights Ra from 0.05 μm to 1.00 μm. In contrast to this, for the samples outside the range of a preferred embodiment of the present invention (the samples having a center line average height of 0.04 μm and 1.10 μm), there was a marked fall in the starting thrust and no-load speed after 20 minutes had elapsed. From the above results, it can be seen that a center line average height from 0.05 μm through 1.00 μm is preferable.

In each of the above mentioned embodiments and examples, polishing streaks were formed in the contact surfaces of the relative motion members, and in addition slide members were joined to the elastic members, but the vibration actuator of the present invention is not so limited. Slide members may be joined to the relative motion member, and polishing streaks may be formed in the contact surface of the elastic member.

Moreover, in each of the above embodiments and examples, elastic members of a rectangular shape were used, but the present invention is not so. For example, it is possible to use cylindrical, square rod shaped and other various elastic members. Similarly, for the relative member, there is no necessary shape.

Moreover, piezoelectric elements have been described as the electro-mechanical converting elements, but the present invention is so limited, and other elements which can convert electrical energy into mechanical displacement can also be used. For example, electro-strictive may be used.

The vibration actuators of the embodiments and examples described above use the ultrasonic vibration region as vibration actuators. However, the vibration actuators with which the present invention is concerned are not so limited to ultrasonic actuators, and the invention can be applied to actuators which use other regions of vibration.

Although a few of the preferred embodiments have been shown and described, it would be appreciated by those skilled in the art that changes may be made in these embodiments without departing from the principles and spirit of the invention, the scope of which is defined in the claims and their equivalents.

What is claimed is:

1. A vibration actuator, comprising:
   a vibration element which generates vibrations and has a contact surface; and
   a relative motion member, which moves with respect to the vibration element in a movement direction upon genertion of vibrations by the vibration element, the relative motion member having a contact surface which is in compressive contact with the vibration element, at least one of the contact surface of the vibration element and the contact surface of the relative motion member being polished to have plural streaky scratches extending in a principal direction, and the principal direction being other than a direction at a right angle with respect to the movement direction.

2. A vibration actuator according to claim 1, wherein the principal direction of the streaky scratches is at an angle with respect to the movement direction.

3. A vibration actuator according to claim 1, wherein the principal direction of the streaky scratches is approximately parallel to the movement direction.

4. A vibration actuator according the claim 1, wherein
   the at least one contact surface polished to have streaky scratches has a center line average height Ra which is a maximum in a rough direction, and
   the center line average height Ra in the rough direction is within the range $0.05 \, \mu m \leq Ra \leq 1.0 \, \mu m$.

5. A vibration actuator according to claim 1, wherein the vibration element has a rectangular configuration.

6. A vibration according to claim 1, wherein the vibration element vibrates in two different modes of vibration.

7. A vibration according to claim 6, wherein the two modes of vibration are a longitudinal vibration and a bending vibration.

8. A vibration actuator according to claim 7, wherein
   the longitudinal vibration is in a direction parallel to the movement direction, and
   the bending vibration is in a direction which intersects the direction of longitudinal vibration.

9. A vibrations actuator, comprising:
   a vibration element which generates vibrations and has a contact surface; and
   a relative motion member, which moves with respect to the vibration element upon generation of vibrations by the vibration element, the relative motion member having a contact surface which is in compressive contact with the vibration element, and at least one of the contact surface of the vibration element and the contact surface of the relative motion member being polished to have plural streaky scratches in irregular directions.

10. A vibration actuator according to claim 9, wherein
    the at least one contact surface polished to have streaky scratches has a center line average height Ra which is a maximum in a rough direction, and
    the center line average height Ra in the rough direction is within the range $0.05 \, \mu m \leq Ra \leq 1.0 \, \mu m$.

11. A vibration actuator according to claim 9, wherein the vibration element has a rectangular configuration.

12. A vibration actuator according to claim 9, wherein the vibration element vibrates in two different modes of vibration.

13. A vibration element according to claim 12, wherein the two modes of vibration are a longitudinal vibration and a bending vibration.

14. A vibration according to claim 13, wherein the relative motion member moves with respect to the vibration element in a movement direction, the longitudinal vibration is in a direction parallel to the movement direction, and the bending vibration is in a direction which intersects the direction of longitudinal vibration.

15. A vibration actuator, comprising:

a vibration element which generates vibrations and has a contact surface; and a relative motion member, which moves with respect to the vibration element upon generation of vibrations by the vibration element, the relative motion member having a contact surface which is in compressive contact with the vibration element, at least one of the contact surface of the vibration element and the contact surface of the relative motion member being polished to have streaky scratches, the plural streaky scratches being formed in irregular circular arcs.

16. A vibration actuator according to claim 15, wherein the at least one contact surface polished to have streaky scratches has a center line average height Ra which is a maximum in a rough direction, and the center line average height Ra in the rough direction is within the range $0.05 \; \mu m \leq Ra \leq 1.0 \; \mu m$.

17. A vibration actuator according to claim 15, wherein the vibration element has a rectangular configuration.

18. A vibration actuator according to claim 15, wherein the vibration element vibrates in two different modes of vibration.

19. A vibration element according to claim 18, wherein the two modes of vibration are a longitudinal vibration and a bending vibration.

20. A vibration actuator according to claim 19, wherein the relative motion member moves with respect to the vibration element in a movement direction, the longitudinal vibration is in a direction parallel to the movement direction, and the bending vibration is in a direction which intersects the direction of longitudinal vibration.

* * * * *

UNITED STATES PATENT AND TRADEMARK OFFICE
CERTIFICATE OF CORRECTION

PATENT NO. : 5,818,147
DATED : Oct. 6, 1998
INVENTOR(S) : Kobayashi et al.

It is certified that error appears in the above-identified patent and that said Letters Patent is hereby corrected as shown below:

The title page should be deleted to appear as per attached title page.

Please delete drawing sheets 1,3 & 4 and substitute drawing sheets 1,3 & 4 as per attached.

Signed and Sealed this

Thirteenth Day of July, 1999

*Attest:*

*Attesting Officer*

Q. TODD DICKINSON

*Acting Commissioner of Patents and Trademarks*

United States Patent [19]
Kobayashi et al.

[11] Patent Number: 5,818,147
[45] Date of Patent: Oct. 6, 1998

[54] VIBRATION ACTUATOR WITH IMPROVED CONTACT SURFACE

[75] Inventors: Mina Kobayashi, Yokohama; Kazuyasu Oone, Urawa, both of Japan

[73] Assignee: Nikon Corporation, Tokyo, Japan

[21] Appl. No.: 843,193

[22] Filed: Apr. 14, 1997

[30] Foreign Application Priority Data

Apr. 12, 1996 [JP] Japan ................... 8-090787
Mar. 27, 1997 [JP] Japan ................... 9-075280

[51] Int. Cl.$^6$ .................................................. H02N 2/00
[52] U.S. Cl. ........................................ 310/323; 310/328
[58] Field of Search .................................. 310/328, 323

[56] References Cited

U.S. PATENT DOCUMENTS

| | | | |
|---|---|---|---|
| 5,039,899 | 8/1991 | Yamaguchi | 310/323 |
| 5,051,647 | 9/1991 | Uchikawa et al. | 310/323 |
| 5,073,739 | 12/1991 | Iijima et al. | 310/323 |
| 5,101,132 | 3/1992 | Yamaguchi | 310/323 |
| 5,124,611 | 6/1992 | Tamai et al. | 310/317 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 29/25.35 |
| 5,200,665 | 4/1993 | Iijima | 310/323 |
| 5,245,243 | 9/1993 | Ohnishi et al. | 310/323 |
| 5,416,375 | 5/1995 | Funakubo et al. | 310/323 |
| 5,654,604 | 8/1997 | Ashizawa | 310/323 |

FOREIGN PATENT DOCUMENTS

7-143771  6/1995  Japan ................. H02N 2/00

OTHER PUBLICATIONS

U.S. application No. 08/337,500, Takagi, filed Nov. 8, 1994, Nikon Corporation.
Piezoelectric Linear Motors for Application to Driving a Light Pick-Up Element, (Mr. Yoshiro Tomikawa et al., 5th Electromagnetic Force Related Dynamics Symposium, Collected Papers, Jun. 9–11, 1993, pp. 393–398)(with English translation).

*Primary Examiner*—Thomas M. Dougherty

[57] ABSTRACT

A vibration actuator has a vibration element which generates vibrations and has a contact surface. The vibration actuator further has a relative motion member which moves in a movement direction with respect to the vibration element upon generation of vibrations by the vibration element. The relative motion member has a contact surface which is in compressive contact with the contact surface of the vibration element. At least one of the contact surface of the vibration element and the contact surface of the relative motion member is polished to have a plural streaky scratches. The plural streaky scratches may be in a principle direction which is in a direction other than a direction at a right angle with respect to the movement direction. In this case, the principle direction may be at angle with respect to the movement direction. Alternatively, the principle direction may be approximately parallel to the movement direction. As an alternative to being formed in the principle direction, the plural streaky scratches may be formed in irregular directions or formed in irregular circular arcs. The at least one contact surface polished to have streaky scratches may have center line average height Ra which is a maximum in a rough direction and is within the range 0.05 µm$\leq$Ra$\leq$1.0 µm.

20 Claims, 4 Drawing Sheets

FIG. 3A  ① IRREGULAR DIRECTION

FIG. 3B  ② OBLIQUE

FIG. 3C  ③ IRREGULAR CIRCULAR ARCUATE

FIG. 3D  ④ LONGITUDINAL

FIG. 3E  ⑤ TRANSVERSE

FIG. 3F  ⑥ SAND POLISHED

FIG. 3G  ⑦ MIRROR SURFACE

FIG. 3H  ⑧ CUT